(12) United States Patent
Chen et al.

(10) Patent No.: US 10,173,167 B2
(45) Date of Patent: Jan. 8, 2019

(54) COMPOSITE METHOD OF TRAPPING CARBON DIOXIDE IN GAS MIXTURE

(71) Applicant: China University of Petroleum-Beijing, Beijing (CN)

(72) Inventors: Guangjin Chen, Beijing (CN); Huang Liu, Beijing (CN); Bei Liu, Beijing (CN); Changyu Sun, Beijing (CN); Xueteng Gao, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 0 days.

(21) Appl. No.: 15/307,569

(22) PCT Filed: Jun. 5, 2014

(86) PCT No.: PCT/CN2014/079259
§ 371 (c)(1),
(2) Date: Mar. 10, 2017

(87) PCT Pub. No.: WO2015/165143
PCT Pub. Date: Nov. 5, 2015

(65) Prior Publication Data
US 2017/0173518 A1 Jun. 22, 2017

(30) Foreign Application Priority Data
Apr. 28, 2014 (CN) .......................... 2014 1 0174701

(51) Int. Cl.
*B01D 53/62* (2006.01)
*B01D 53/02* (2006.01)
(Continued)

(52) U.S. Cl.
CPC ....... *B01D 53/1475* (2013.01); *B01D 53/025* (2013.01); *B01D 53/04* (2013.01);
(Continued)

(58) Field of Classification Search
None
See application file for complete search history.

(56) References Cited

U.S. PATENT DOCUMENTS

| 4,775,519 A * | 10/1988 | Yit Nieh | B01D 53/1493 423/226 |
| 2012/0248372 A1* | 10/2012 | Bara | B01D 53/1456 252/184 |
| 2013/0280151 A1* | 10/2013 | Lee | B01D 53/62 423/226 |

FOREIGN PATENT DOCUMENTS

| CN | 1887407 A | 1/2007 | |
| CN | 102389686 | * 3/2012 | B01D 53/10 |

(Continued)

OTHER PUBLICATIONS

International Search Report dated Feb. 3, 2015 for PCT application No. PCT/CN2014/079259.

*Primary Examiner* — Daniel Berns
(74) *Attorney, Agent, or Firm* — Ohlandt, Greeley, Ruggiero & Perle, LLP

(57) ABSTRACT

A hybrid method for capturing $CO_2$ from a gas mixture is provided, comprising a step of contacting the $CO_2$ containing gas mixture with a slurry consisting of a liquid medium, imidazole or imidazole derivative(s), and a metal-organic framework material (MOFs). For the slurry system, the mass fraction of the imidazole or imidazole derivative(s) in it ranging from 2 to 50% and the mass fraction of the metal-organic framework material in it ranging from 5 to 25%. In the technical solution provided in the present invention, through combining absorptive separation by the liquid solution in which the imidazole or imidazole derivative(s) is dissolved, adsorption separation by the MOF material suspended in the solution, and selective permeation separation by a liquid medium film forms on the outside surface of the (Continued)

suspended MOFs, an absorption-adsorption hybrid separation effect for $CO_2$ gas mixtures is efficiently achieved. In the $CO_2$ capture method provided in the present invention, conventional absorption separation and adsorptive separation technologies are effectively combined, furthermore, the addition of imidazole or imidazole derivative(s) substantially increases both the $CO_2$ capture ability and capture amount of the MOFs/liquid slurry, showing a great potential in industrial applications.

9 Claims, 1 Drawing Sheet

(51) Int. Cl.

| | |
|---|---|
| *B01D 53/04* | (2006.01) |
| *B01D 53/14* | (2006.01) |
| *B01D 53/80* | (2006.01) |
| *B01D 53/96* | (2006.01) |
| *C10L 3/10* | (2006.01) |
| *B01J 20/22* | (2006.01) |

(52) U.S. Cl.
CPC ......... *B01D 53/1425* (2013.01); *B01D 53/62* (2013.01); *B01D 53/80* (2013.01); *B01D 2251/21* (2013.01); *B01D 2252/2025* (2013.01); *B01D 2252/2026* (2013.01); *B01D 2252/20405* (2013.01); *B01D 2252/20426* (2013.01); *B01D 2252/20431* (2013.01); *B01D 2252/20473* (2013.01); *B01D 2253/204* (2013.01); *B01D 2256/245* (2013.01); *B01D 2257/504* (2013.01); *B01D 2258/0283* (2013.01); *B01D 2258/05* (2013.01); *C10L 3/104* (2013.01); *C10L 2290/542* (2013.01); *Y02C 10/04* (2013.01); *Y02C 10/06* (2013.01); *Y02C 10/08* (2013.01)

(56) References Cited

FOREIGN PATENT DOCUMENTS

| | | |
|---|---|---|
| CN | 102389686 A | 3/2012 |
| FR | 2972645 A1 | 9/2012 |

\* cited by examiner

COMPOSITE METHOD OF TRAPPING CARBON DIOXIDE IN GAS MIXTURE

TECHNICAL FIELD

The present invention relates to a hybrid method for capturing $CO_2$ from gas mixtures, which pertains to the technical field of $CO_2$ separation.

BACKGROUND ART

With various extreme climate phenomena occurring around the world, the threat of global climate changes caused by greenhouse gases such as $CO_2$ is growing with each passing day, and it has reached an agreement to urge the reduction in greenhouse gas emission together. It is known that $CO_2$ accounts for 77% of the greenhouse gas emission generated by human activities, and half of the total greenhouse gas emission is attributed to $CO_2$ emission resulting from combustion of fossil fuels, thus, the reduction in $CO_2$ emission is a critical point for realizing the reduction in greenhouse gases' emission. Common $CO_2$ containing gas mixtures include flue gas, refinery gas, natural gas, synthesize gas, converted gas, and hydrogen-producing gas and the like. The concentration of $CO_2$ in these gas mixtures ranging from 5% to 50%, and the other corresponding gas components including $N_2$, $O_2$, CO, $H_2$, $CH_4$, $C_2H_6$, $SO_2$, $H_2S$, as well as organosulfur compounds such as $CH_3S$, COS, and so on.

Well-established methods of trapping and separating $CO_2$ by absorption in domestic and international industries and the major industrially chemical absrobents include monoethanolamine (MEA), diethanolamine (DEA), di-isopropanolamine (DIPA), and methyl diethanolamine (MDEA), and the like. Furthermore, some sterically hindered amines such as 2-amino-2-methyl-1-propanol (AMP) may also be used as an absorbent because of its high $CO_2$ absorption capacity. Among these methods, aqueous MEA solution is the most widely used ones contributing from its relatively high $CO_2$ absorption efficiency and capacity. However, the aqueous MEA solution also has some drawbacks such as the tremendous amount of thermal energy required for the regeneration of solution as well as operational problems caused by chemical corrosion and degradation. In order to avoid excessive corrosion, generally only 10 to 30 wt % of MEA is contained in the aqueous MEA solution, with the rest is water. Since the solution containing 70% to 90% of water has to be heated to regenerate the aqueous MEA solution, as a result the uptake of water into the gas stream causes intensive energy consumption. Furthermore, other alkanolamine systems also show all sorts of drawbacks. To improve the $CO_2$ absorption rate in some chemical absorbents such as di-isopropanolamine (DIPA) and methyl diethanolamine (MDEA) which usually show low $CO_2$ absorption rate, monoethanolamine (MEA) and piperazine (PZ) are added, generating some so called improved absorption separation methods. However, drawbacks of corrosion and chemical degradation are still inherently connected to these mixing absorbents.

Adsorption separation is another $CO_2$ capture method and has realized in industrial application in some places, while this kind separation method exists some drawbacks as well. As an example for the separation of gas mixtures in the conventional fixed bed adsorption separation tower, to realize a continuous separation process when using both pressure swing adsorption and temperature swing adsorption methods, a switching operation between the adsorption separation tower and regeneration tower should be conducted. At the same time, the big amount of adsorption heat released during the separation process abruptly increases the temperature of the bed layer, leading to a low separation efficiency. When using a moving bed or a simulated moving bed apparatus to perform continuous up-flow adsorption separation process, the adsorption capacity of the adsorbents is effectively utilized, but due to the complicated design of the up-flow procedure and low operation flexibility, therefore, such a method is only suitable to separate substances which have low selectivity and slow mass transfer rate.

In sum, it is important to improve the separation efficiency of conventional $CO_2$ separation technologies or to develop more efficient and economic $CO_2$ capture methods.

SUMMARY OF INVENTION

To solve the technical problems mentioned above, it is an objective of the present invention to provide a hybrid method for capturing $CO_2$ from a gas mixture, to achieve high $CO_2$ capture efficiency by contacting a gas mixture containing $CO_2$ with a slurry mixture of MOFs and a liquid medium comprising imidazole or imidazole derivative(s).

In order to achieve this objective, a hybrid method for capturing $CO_2$ from a gas mixture is first provided in the present invention, including a step of contacting the $CO_2$ containing gas mixture with a slurry mixture, wherein the slurry mixture consists of a liquid medium, imidazole or imidazole derivative(s), and a metal-organic framework material (MOFs).

In such a hybrid method, preferably, the content of the imidazole or imidazole derivative(s) ranging from 2% to 50%, and the content of the metal-organic framework material ranging from 5% to 25%, by weight with respect to the slurry mixture, with the rest being the liquid medium.

The method for capturing $CO_2$ from a gas mixture provided in the present invention, benefiting from the extremely strong interaction between $CO_2$ molecules and the imidazole or imidazole derivative(s), the addition of imidazole or imidazole derivative(s) into the MOFs/liquid slurry can substantially increases the $CO_2$ absorption amount in the latter. The imidazole-liquid medium mixing solution plays multiple roles during the $CO_2$ separation process: (I) first, absorption separation for the $CO_2$ containing gas mixture; (II) transmits the adsorption heat generated in the MOF material; and (III) the liquid medium molecules form a film-like dense structure on the outside surface of the MOF material, which functions as a barrier for the nonpolar molecules, while $CO_2$ molecules with a quadrupole moment can easily pass through it and be further adsorbed by the MOF material suspended in the slurry.

In the above method, the imidazole or imidazole derivative(s) is added as an accelerator for capturing $CO_2$ in the MOFs/liquid slurry system. Preferably, the imidazole and the imidazole derivative(s) are 5-membered aromatic heterocyclic compounds having two m-nitrogen atoms in the molecular structure; more preferably, the imidazole derivative is one or a mixture of methyl imidazole, benzimidazole, and dimethyl imidazole.

In the above method, the metal-organic framework material used is advantageously a material having pore windows of a small diameter; preferably, the metal-organic framework material is a metal-organic framework material having a pore window diameter ranging from 0.25 nm to 0.4 nm (preferably from 0.3 nm to 0.4 nm). More preferably, the metal-organic framework material used is ZIF-8, ZIF-65, ZIF-67, ZIF-71, ZIF-20, ZIF-21, ZIF-77 or the like. These metal-organic framework materials are stable in organic solvents, as well as at high temperatures and high pressures.

In the above method, the liquid medium (solvent) used is advantageously a solvent having a relatively strong intermolecular interaction (e.g., hydrogen bonding), but except water. Preferably, the diameter of molecules of the liquid medium used in this provided invention is should larger than the diameter of pore window of the metal-organic framework material. According to a specific embodiment of the present invention, preferably, the liquid medium used is ethylene glycol, triethylene glycol, or a liquid polyethylene glycol having a condensation degree higher than that of triethylene glycol, and may include other macromolecular organic solvents but water.

In the above method, preferably, the slurry mixture is composed of triethylene glycol, methyl imidazole, and ZIF-8 in a mass ratio of 51:34:15.

In the above method, preferably, the $CO_2$ containing gas mixture contacts the slurry mixture (or referred to as "suspension slurry") under the condition of a temperature ranging from 273.15K to 353.15K and a pressure ranging from 0.1 MPa to 15.0 MPa. The corresponding gas-liquid volume ratio (gas mixture:slurry) ranging from 5 to 200.

In the above method, preferably, the $CO_2$ captured slurry is regenerated under the condition of ambient temperature through vacuuming, or under the condition of heating at a low pressure, and then be reused; more preferably, the vacuum condition refers to an absolute pressure ranging from 0.0002 atm to 0.5 atm, the low pressure condition refers to an absolute pressure ranging from 0.5 atm to 1.0 atm, and the heating temperature ranging from 323.15 K to 363.15 K.

In the above method, preferably, the gas mixture containing $CO_2$ is one of flue gas, biogas, IGCC (Integrated Gasification Combined Cycle) gas mixture and natural gas.

In the method of capturing $CO_2$ from a gas mixture provided in the present invention, by utilizing the flowing characteristic of the slurry in a tower-type apparatus, the gas mixture containing $CO_2$ may continuously contact the slurry mixture, and continuous separation operations of separation-releasing-separation are achieved, so that $CO_2$ can be continuously separated from the gas mixture. In particular, the gas mixture and the slurry may reverse contact in an absorption tower. And The $CO_2$ captured slurry and the regenerated slurry may exchange heat from each other via a heat exchanger, to achieve thermal integration.

The present invention provides a hybrid method for efficiently separating $CO_2$ from a gas mixture, wherein the material of one MOFs is added into a liquid mixture in which imidazole or imidazole derivative(s) has been dissolved, to form a suspension slurry, which is then used for the separation of $CO_2$ from the gas mixture. In the liquid mixture in which imidazole or imidazole derivative(s) is dissolved, $CO_2$ has significantly higher solubility than other corresponding gas components. The gas mixture is firstly separated by the liquid medium due to the different solubility of gas components in it, and then the MOF material will selectively adsorb $CO_2$ from the dissolved gases. Attributing to the much stronger interaction between the MOF material with $CO_2$ molecules than that with other nonpolar gas components, therefore, a hybrid absorption separation adsorption separation process is achieved. FIG. 1 is an schematic of the hybrid absorption-adsorption separation process for $CO_2$ gas mixtures in the slurry provided in the present invention. Take the mixture of methylimidazole-ethylene glycol as the liquid medium, as shown in FIG. 1, the separation mechanism is that, compared to accompanying components (one or more of $CH_4$, $N_2$, $H_2$, $C_2H_4$, $C_2H_6$, and the like), more $CO_2$ is dissolved and absorbed in the methylimidazole-ethylene glycol mixture, therefore an absorption separation process for the gas mixture has first been obtained by the liquid mixture, and then $CO_2$ in the dissolved gases is further selectively adsorbed by the MOF material suspended in the slurry due to the stronger interaction between the MOF material with $CO_2$ than that with other gas components, achieving an absorption-adsorption hybrid separation effect. Meanwhile, due to the strong hydrogen bonding between ethylene glycol molecules, the ethylene glycol molecules will form a film-like dense structure on the outside surface of the MOF material, and $CO_2$ can easily pass through the ethylene glycol film due to its large quadrupole moment and high solubility in the liquid, to be adsorbed by the suspended MOF material, whereas the nonpolar accompanying molecules can hardly get through the ethylene glycol film at a relatively low partial pressure (<3.5 MPa) and thus cannot be adsorbed by the MOF material. Therefore, the ethylene glycol medium in the slurry mixture not only acts an absorption separation medium for $CO_2$, but also help to realize the absorption-adsorption hybrid separation method.

In terms of the separation effect, the $CO_2$ capture method provided in the present invention has faster $CO_2$ capture rate than conventional water-washing method or chemical absorption method. As compared to a method of separating $CO_2$ from a gas mixture by using the single MOFs/glycol slurry, the method provided in the present invention further includes imidazole or imidazole derivative(s). The addition of imidazole or imidazole derivative(s) can greatly improve the $CO_2$ absorbing capacity of the whole system contributing from the far stronger interaction between $CO_2$ and imidazole or imidazole derivative(s) than that between $CO_2$ and ethylene glycol or other liquid medium. Furthermore, the liquid medium can not only selectively absorb $CO_2$, but also forms a dense film-like structure on the surface of the MOF material, this film can function as a barrier to nonpolar molecules ($CH_4$, $N_2$, $H_2$ etc.) while $CO_2$ molecules with a quadrupole moment can easily pass through it and to be further adsorbed by the MOF material suspended in the slurry, so as to achieve a permeation separation effect.

The technical solution provided in the present invention produces a high efficiency hybrid separation effect for $CO_2$ by utilizing absorption separation by a liquid slurry in which imidazole/imidazole derivative(s) is dissolved, adsorption separation by a MOF material, and permeation separation by a liquid medium film on the surface of the material together. The $CO_2$ capture method provided in the present invention combines conventional absorption separation and adsorption separation processes, and with the addition of imidazole/imidazole derivative(s), which greatly improves the $CO_2$ capturing ability of the slurry system, showing a great potential in industrial applications.

REFERENCE NUMBERS OF MAIN COMPONENTS

Figure 1:
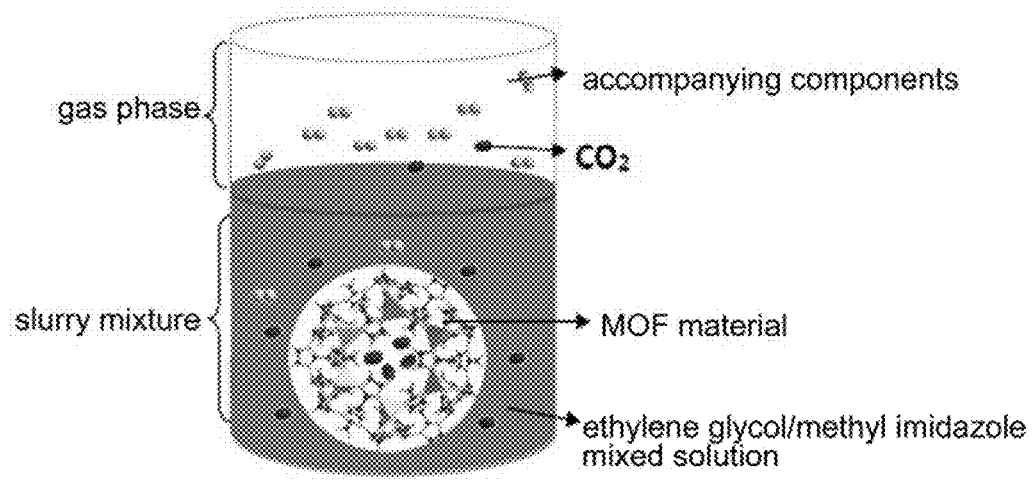
FIG. 1 is a schematic of the hybrid absorption-adsorption separation process for $CO_2$ gas mixtures provided in the present invention.

Air bath 1  Sapphire cell 2  Stirring device 3  Magnet 4  Piston 5
Cut-off valves 6, 8, 11, 13, 14  Hand pump 7  Heise pressure meter 9
High-pressure gas cylinder 10  Three-way valve 12  Equilibrium cell 15

DETAILED DESCRIPTION OF THE INVENTION

For a clearer understanding of the technical features, purposes and beneficial effects of the present invention, detailed description of the technical solutions of the present invention are hereinafter provided, which cannot be construed as limitation to the implementable scope of the present invention.

Example 1

Figure 2:
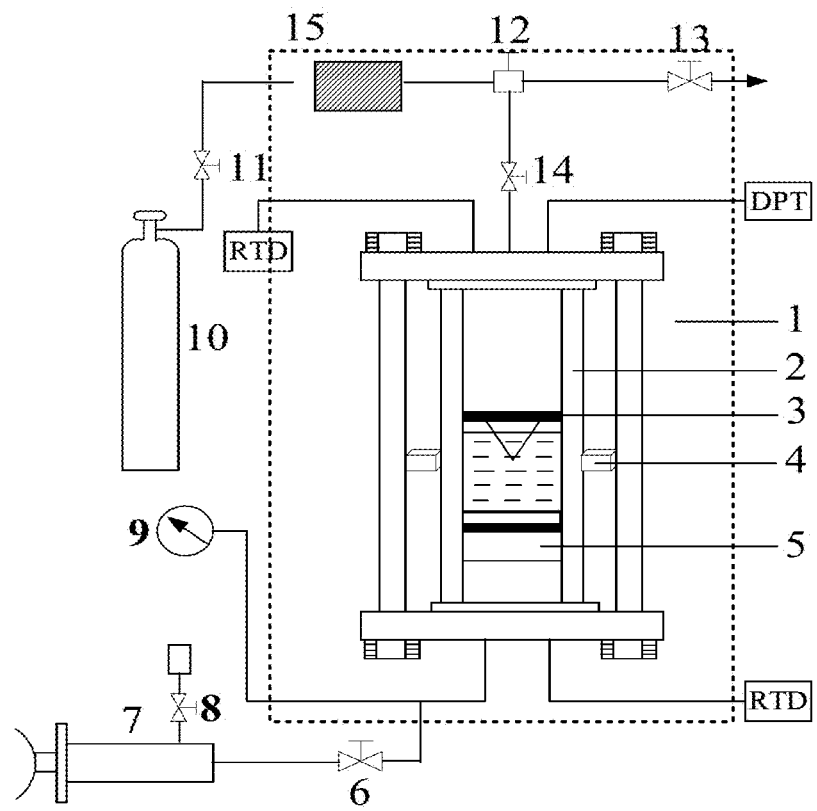
FIG. 2 is the schematic diagram of the experimental apparatus used in Example 1.

In this example, a hybrid method for capturing $CO_2$ from a gas mixture is provided, which employs an apparatus as shown in FIG. 2, which has been also described in CN 102389686A patent before. In this example, ethylene glycol was used as the liquid medium, methylimidazole was used as an accelerator, ZIF-8 was used as the MOF material, and the corresponding gas mixture was a $CO_2/N_2$ (20.65/79.35 mol %) gas mixture.

Prior to the experiment, the sapphire cell 2 was first unloaded, washed with distilled water, rinsed with ethylene glycol three times and wiped dry; then, ethylene glycol, methylimidazole, and ZIF-8 were added into the sapphire cell 2 with a mass ratio of 51:34:15 and evenly; subsequently, the sapphire cell 2 was installed back into the air bath 1. The sapphire cell 2, equilibrium cell 15, and the whole high pressure piping system were vacuumed. Afterwards, enough amount of synthetic gas was discharged from the high-pressure cylinder 10 to the equilibrium cell 15. After the temperature of the air bath 1 and the pressure within the equilibrium cell 15 were stabilized, the pressure of the equilibrium cell 15 was recorded, which is used to calculate the mole number of gases in the equilibrium cell 15 (detailed calculation method is described below). The top valve of the sapphire cell was opened slowly then, letting the desired amount of synthetic gas flow into the sapphire cell 2 from the equilibrium cell 15. Afterwards, this valve was closed and the magnetic stirrer 3 was turned on. With the absorption of gas mixture by the slurry, the pressure in the sapphire cell decreased gradually. When the system pressure remained as a constant for at least 2 hours, we considered the equilibrium of system was achieved. The pressure in the equilibrium cell 15 and the sapphire cell 2 were recorded. Gas mixture in the equilibrium gas phase of the sapphire cell was sampled under constant pressure by pushing the connected hand pump and analyzed by a HP 7890 gas chromatograph.

The gas composition in the equilibrium slurry phase was determined through mass balance as described below.

In the following calculation procedure, $z_1$, $y_1$, and $x_1$ are the molar fraction of $N_2$ in the initial (feed) gas, the equilibrium gas phase, and the equilibrium absorption phase, respectively; $z_2$, $y_2$, and $x_2$ are the molar fraction of $CO_2$ in the initial (feed) gas, the equilibrium gas phase, and the equilibrium absorption phase, respectively; T is the experimental temperature; $P_1$ and $P_2$ are the initial pressure and the separation equilibrium pressure in the equilibrium cell, respectively, and $P_E$ is the equilibrium pressure of the sapphire cell. The total mole number of gas mixture that was injected into the sapphire cell ($n_0$) and the total gas amount ($n_E$) in the equilibrium gas phase of the sapphire cell after absorption and adsorption equilibrium are calculated by the following equations:

$$n_0 = \frac{P_1 V_E}{Z_1 RT} - \frac{P_2 V_E}{Z_2 RT}$$

$$n_E = \frac{P_E V_A}{Z_E RT}$$

where $V_E$ is the volume of the equilibrium cell, $V_A$ is the volume of equilibrium gas phase in the sapphire cell at the end of each experimental run; $Z_1$, $Z_2$, and $Z_E$ respectively correspond to the gas compressibility factors at pressures $P_1$, $P_2$ and $P_E$, and are calculated by the BWRS state equations:

$$Z_1 = Z(T, P_1, z_i)$$

$$Z_2 = Z(T, P_2, z_i)$$

$$Z_E = Z(T, P_E, y_i)$$

The mole number of $N_2$ having entered the sapphire cell ($n_1$) and that of $CO_2$ ($n_2$) are calculated as:

$$n_1 = n_0 \times z_1, \; n_2 = n_0 \times z_2$$

The mole number of $N_2$ and that of $CO_2$ in the equilibrium gas phase after separation equilibrium are calculated as:

$$n_E^1 = n_E \times y_1, \; n_E^2 = n_E \times y_2$$

The molar fraction of $N_2$ and $CO_2$ in the equilibrium slurry phase can be obtained by the following formulas:

$$x_1 = \frac{n_1 - n_E^1}{n_0 - n_E}$$

$$x_2 = \frac{n_2 - n_E^2}{n_0 - n_E}$$

Both the separation factor ($\beta$) of $CO_2$ over $N_2$ and the solubility coefficient of $CO_2$ in the slurry ($S_c$ mol·(L bar)$^{-1}$) are used to characterize the $CO_2$ capture ability of the slurry system:

$$\beta = \frac{x_2}{y_2} \bigg/ \frac{x_1}{y_1}$$

$$s_c = (n_2 - n_{E2})/(S_v \times P_E \times y_2)$$

Where $S_v$ is the volume of slurry.

To demonstrate the excellent $CO_2$ capture ability of the method provided in the present invention, separation experiments for a $CO_2/N_2$ (20.65/79.35 mol %) gas mixture at 293.15 K in dry ZIF-8, pure ethylene glycol, an ZIF-8/glycol slurry, and an ZIF-8/glycol-methylimidazole slurry were performed, the corresponding experimental results are summarized in Table 1.

As Table 1 shows, compared to dry ZIF-8, pure ethylene glycol, and the ZIF-8/glycol (85:15) slurry, much smaller $CO_2$ mole fraction ($y_2$) in the equilibrium gas phase, higher $CO_2$ selectivity ($\beta$), and higher $CO_2$ solubility coefficient ($S_c$) are obtained in the ZIF-8/glycol-methylimidazole slurry, in which the mass ratio among ZIF-8, glycol and methylimidazole was equaled to 15:51:34, demonstrating the excellent promoting effect of methylimidazole on the whole separation system. Furthermore, in order to verify the reusability of the slurry system provided in the present invention, $CO_2$ captured ZIF-8/glycol-methylimidazole slurry was then regenerated at room temperature through vacuuming and was used to separate the same $CO_2/N_2$ gas mixture again, the relevant experimental results was also listed in Table 1. We observed no loss of $CO_2$ separation ability of the slurry.

TABLE 1

$CO_2/N_2$ (20.65/79.35 mol %) gas mixture separation results in four different separation media containing ZIF-8 at 293.15 K

| Separation media | $^aP_0$/ (MPa) | $P_E$/ (MPa) | $y_2$/ % | $x_2$/ % | β | $S_c$/mol · (L bar)$^{-1}$ |
|---|---|---|---|---|---|---|
| Dry ZIF-8 | 1.90 | 1.63 | 16.59 | 51.20 | 5.28 | — |
| Pure ethylene glycol | 1.79 | 1.64 | 17.03 | 72.12 | 13 | 0.06 |
| ZIF-8/glycol slurry | 1.75 | 1.5 | 10.10 | 89.54 | 76 | 0.15 |
| ZIF-8/glycol-methylimidazole slurry | 1.65 | 1.33 | 1.73 | 86.47 | 362 | 1.29 |
| Recycled ZIF-8/glycol-methylimidazole slurry | 1.64 | 1.33 | 1.74 | 86.37 | 358 | 1.28 |

$^aP_0$ is the initial pressure in the sapphire cell

Example 2

In this example, a ZIF-8/triethylene glycol-methylimidazole slurry was used to separate the $CO_2/N_2$ (20.65/79.35 mol %) gas mixture at 293.15 K, in which the mass ratio among ZIF-8, triethylene glycol and methylimidazole was specified to 15:51:34. The same experimental setup and data processing are used in this example have been detailed in example 1. And the corresponding separation results are shown in Table 2.

As Table 2 shows, similar to ZIF-8/glycol-methylimidazole shown in example 1, high $CO_2$ selectivity and solubility coefficient have also been obtained by using this ZIF-8/triethylene glycol-methylimidazole slurry. It should be noted that attributing to the relative higher viscosity of triethylene glycol than that of ethylene glycol, $CO_2$ capture rate in the ZIF-8/triethylene glycol-methylimidazole slurry is some slower than that in ZIF-8/glycol-methylimidazole slurry.

TABLE 2

Results of separation of CO2/N2 by a triethylene glycol/methyl imidazole/ZIF-8 slurry mixture

| Separation medium | $P_0$/ (MPa) | $P_E$/ (MPa) | $y_2$/ % | $x_2$/ % | β | $S_c$/mol · (L bar)$^{-1}$ |
|---|---|---|---|---|---|---|
| ZIF-8/triethylene glycol-methyl imidazole slurry | 1.65 | 1.35 | 1.88 | 87.15 | 354 | 1.23 |

Example 3

In this example, a ZIF-8/glycol-imidazole slurry was used to separate the $CO_2/N_2$ (20.65/79.35 mol %) gas mixture at 293.15 K, in which the mass ratio between ZIF-8, glycol and imidazole was specified to 15:51:34. The same experimental setup and data processing are used in this example have been detailed in example 1. And the corresponding separation results are shown in Table 3.

As Table 3 shows, both the $CO_2$ selectivity and solubility coefficient obtained in this ZIF-8/glycol-imidazole slurry are even some higher than that in the ZIF-8/glycol-methylimidazole slurry shown in example 1, demonstrating the better $CO_2$ capture ability of the former. This effect should be attributed to the fact that compared to methylimidazole, imidazole has a smaller molecule mass, which suggests under the same condition, more imidazole molecules may exist in the slurry to react with $CO_2$ than that of methylimidazole.

TABLE 3

Results of separation of $CO_2/N_2$ by an ethylene glycol/imidazole/ZIF-8 slurry mixture

| Separation medium | $P_0$/ (MPa) | $P_E$/ (MPa) | $y_2$/ % | $x_2$/ % | β | $S_c$/mol · (L bar)$^{-1}$ |
|---|---|---|---|---|---|---|
| ZIF-8/glycol-imidazole slurry | 1.65 | 1.30 | 1.50 | 85.68 | 393 | 1.33 |

Example 4

In this example, a ZIF-8/glycol-benzimidazole slurry was used to separate the $CO_2/N_2$ (20.65/79.35 mol %) gas mixture at 293.15 K, in which the mass ratio between ZIF-8, glycol and benzimidazole was specified to 15:51:34. The same experimental setup and data processing are used in this example have been detailed in example 1. And the corresponding separation results are shown in Table 4.

As Table 4 shows, attributing to the much larger molecular mass of benzimidazole than that of methylimidazole, under the same experimental conditions, both the $CO_2$ selectivity and solubility coefficient in the ZIF-8/glycol-benzimidazole slurry is some smaller than that in ZIF-8/glycol-methylimidazole slurry shown in example 1. However, it should be noted that the $CO_2$ separation ability of the ZIF-8/glycol-benzimidazole slurry is still much better than that of pure ethylene glycol, ZIF-8 and ZIF-8/glycol slurry.

TABLE 4

Results of separation of $CO_2/N_2$ by an ethylene glycol/benzimidazole/ZIF-8 slurry mixture

| Separation medium | $P_0$/ (MPa) | $P_E$/ (MPa) | $y_2$/ % | $x_2$/ % | β | $S_c$/mol · (L bar)$^{-1}$ |
|---|---|---|---|---|---|---|
| ZIF-8/glycol-benzimidazole slurry | 1.66 | 1.38 | 2.21 | 87.83 | 319 | 1.18 |

Example 5

In this example, a ZIF-67/glycol-methylimidazole slurry was used to separate the $CO_2/N_2$ (20.65/79.35 mol %) gas mixture at 293.15 K, in which the mass ratio between ZIF-67, glycol and methylimidazole was specified to 15:51:34. The same experimental setup and data processing are used in this example have been detailed in example 1. And the corresponding separation results are shown in Table 5.

As can be seen from Table 5, both the $CO_2$ selectivity and solubility coefficient obtained in ZIF-67/glycol-methylimidazole slurry are even some higher than that in ZIF-8/glycol-methylimidazole slurry shown in example 1, demonstrating ZIF-67 can also be used to realize the absorption-adsorption hybrid method provided in this invention.

TABLE 5

Results of separation of $CO_2/N_2$ by an ethylene glycol/methyl imidazole/ZIF-67 slurry mixture

| Separation medium | $P_0/$ (MPa) | $P_E/$ (MPa) | $y_2/$ % | $x_2/$ % | $\beta$ | $S_c$/mol · (L bar)$^{-1}$ |
|---|---|---|---|---|---|---|
| ZIF-67/glycol-methylimidazole slurry | 1.64 | 1.28 | 1.32 | 85.13 | 428 | 1.80 |

Example 6

In order to broaden the application range of the absorption-adsorption hybrid separation method provided in this invention, in this example, a ZIF-8/glycol-methylimidazole slurry was used to separate a $CO_2/CH_4$ (21.93/78.07 mol %) gas mixture at 293.15 K. In this experimental run, the mass ratio among ZIF-8, glycol and methylimidazole was specified to 15:51:34. The same experimental setup and data processing are used in this example have been detailed in example 1. The corresponding separation results are shown in Table 6.

TABLE 6

Results of separation of $CO_2/CH_4$ by an ethylene glycol/methyl imidazole/ZIF-8 slurry mixture

| Separation medium | $P_0/$ (MPa) | $P_E/$ (MPa) | $y_2/$ % | $x_2/$ % | $\beta$ | $S_c$/mol · (L bar)$^{-1}$ |
|---|---|---|---|---|---|---|
| ZIF-8/glycol-methylimidazole slurry | 0.65 | 0.49 | 2.05 | 74.24 | 138 | 1.12 |

As Table 6 shows, $CO_2$ can be effectively separated from the $CO_2/CH_4$ gas mixture by using the ZIF-8/glycol-methylimidazole slurry. The obtained $CO_2$ over $CH_4$ selectivity is much higher than that reported in the literature by using other separation media. Furthermore, the $CO_2$ solubility coefficient ($S_C$) in the slurry is also much higher than those obtained from the water-based technology and in the ionic liquids reported in the literature. Demonstrating the proposed absorption-adsorption hybrid separation method can also be used to separate $CO_2/CH_4$ gas mixtures.

Example 7

In order to broaden the application range of the absorption-adsorption hybrid separation method proposed in this invention, in this example, a ZIF-8/glycol-methylimidazole slurry was used to separate a $CO_2/H_2$ (23.6/76.4 mol %) gas mixture at 293.15 K. In this experimental run, the mass ratio among ZIF-8, glycol and methylimidazole was specified to 15:51:34. The same experimental setup and data processing are used in this example have been detailed in example 1. And the corresponding separation results are shown in Table 7.

TABLE 7

Results of separation of $CO_2/H_2$ by an ethylene glycol/methyl imidazole/ZIF-8 slurry mixture

| Separation medium | $P_0/$ (MPa) | $P_E/$ (MPa) | $y_2/$ % | $x_2/$ % | $\beta$ | $S_c$/mol · (L bar)$^{-1}$ |
|---|---|---|---|---|---|---|
| ZIF-8/glycol-methylimidazole slurry | 4.13 | 3.34 | 2.02 | 95.16 | 951 | 1.21 |

As Table 7 shows, $CO_2$ can also be effectively separated from $CO_2/H_2$ gas mixtures by using the ZIF-8/glycol-methylimidazole slurry, the obtained $CO_2$ over $H_2$ selectivity is much higher than that reported in the literature. Meanwhile, the obtained $CO_2$ solubility coefficient ($S_c$) is also much higher than those reported in ionic liquids. Demonstrating the proposed absorption-adsorption hybrid separation method can also be used to separate $CO_2/H_2$ gas mixtures.

All results mentioned above demonstrate that the hybrid method proposed in the present invention has high $CO_2$ capture ability and capture amount.

What is claimed is:

1. A hybrid method for capturing $CO_2$ from a gas mixture, the method comprising:
    contacting the $CO_2$ containing gas mixture with a slurry mixture consisting of: (1) a liquid medium, (2) imidazole or benzimidazole, and (3) a metal-organic framework material,
    wherein the content of the imidazole or benzimidazole ranges from 2% to 50%,
    wherein the content of the metal-organic framework material ranges from 5% to 25% by weight with respect to the slurry mixture, and
    wherein the liquid medium is ethylene glycol or triethylene glycol.

2. The method according to claim 1, wherein the metal-organic framework material has a diameter of pore window that ranges from 0.25 to 0.4 nm.

3. The method according to claim 2, wherein the metal-organic framework material is ZIF-8, ZIF-65, ZIF-67, ZIF-71, ZIF-20, ZIF-21, or ZIF-77.

4. The method according to claim 1, wherein the liquid medium molecules have a diameter that is larger than the diameter of pore window of the metal-organic framework material.

5. The method according to claim 1, wherein the step of contacting the $CO_2$ containing gas mixture with the slurry mixture is conducted under the conditions of a temperature that ranges from 273.15 K to 353.15 K and a pressure that ranges from 0.1 MPa to 15.0 MPa.

6. The method according to claim 1, further comprising:
    forming a $CO_2$ captured slurry mixture after the $CO_2$ containing gas mixture contacted with a slurry mixture, and
    recycling the $CO_2$ captured slurry mixture after the absorbed gas is released under the condition of ambient temperature through vacuuming or under the condition of heating at an absolute pressure that ranges from 0.5 atm to 1.0 atm.

7. The method according to claim 6, wherein the vacuum refers to an absolute pressure that ranges from 0.0002 atm to 0.5 atm, and the heating temperature ranges from 323.15 K to 363.15 K.

8. The method according to claim 1, wherein the $CO_2$ containing gas mixture includes one or a combination of more of flue gas, biogas, integrated gasification combined cycle (IGCC) gas mixture and natural gas.

9. The method according to claim 1, wherein the volume ratio between the gas mixture containing $CO_2$ and the slurry mixture is from 5 to 200:1.

* * * * *